2,810,659

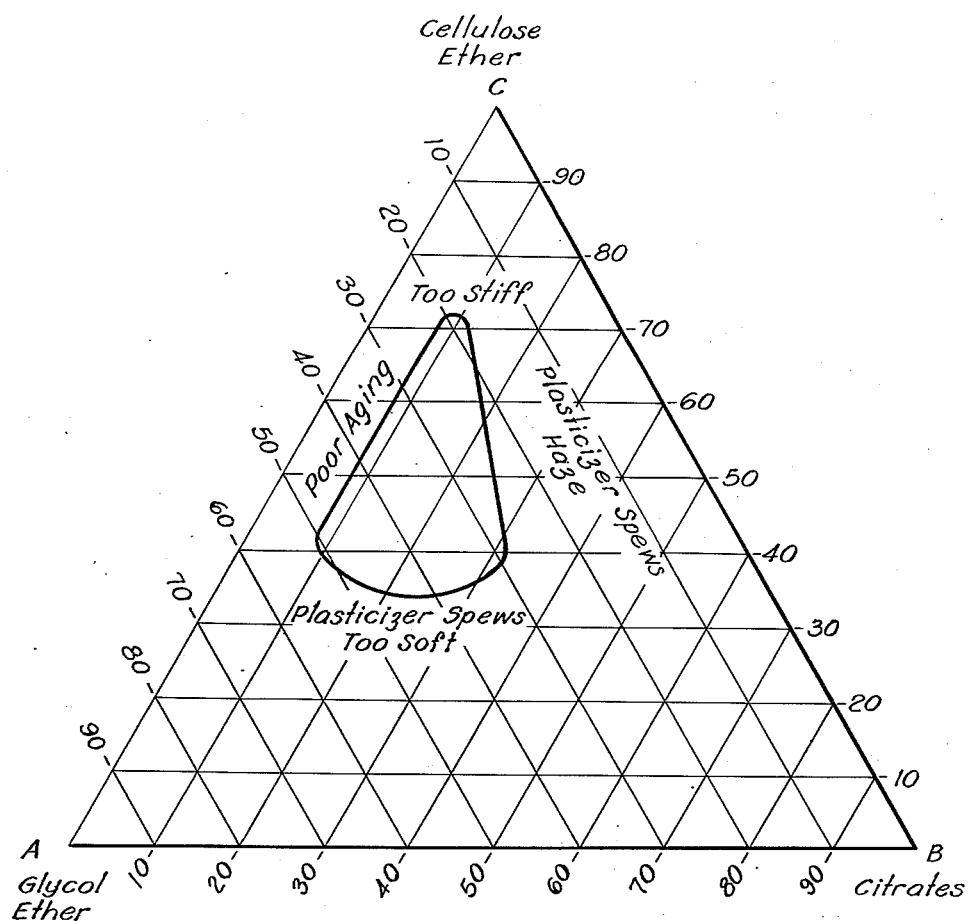
INVENTORS
George K. Greminger, Jr.
Miles A. Weaver
BY Griswold & Burdick
ATTORNEYS United States Patent Office 2,810,659
Patented Oct. 22, 1957

THERMOPLASTIC COMPOSITIONS OF WATER-SOLUBLE CELLULOSE ETHERS

George K. Greminger, Jr., Midland, and Miles A. Weaver, Ithaca, Mich., assignors to The Dow Chemical Company, Midland, Mich., a corporation of Delaware Application November 25, 1953, Serial No. 394,326

6 Claims. (Cl. 106—181)

This invention relates to thermoplastic, water-soluble compositions of certain cellulose ethers.

Methods for fabricating useful articles from water-soluble cellulose ethers have been limited to casting and dipping from aqueous solutions. Because of the unique solubility characteristics of those ethers many difficulties arose when it was attempted to use such methods. For example, the temperature of the solution had to remain below the gel point of the cellulose ether during the shaping operation. Another object was that the amount of cellulose ether in solution had to be restricted, because the viscosity of the solution had to be low enough for casting or dipping operations. A still further objection was the difficulty in dissolving sufficient amounts of the higher viscosity grades of the ethers. Therefore, so that the cellulose ethers may be used in a wider variety of applications for which their properties are ideally suited, it has long been desired to find a thermoplastic water-soluble cellulose ether composition which could be thermally fabricated. One such composition has been disclosed by Silvernail in U. S. Patent 2,602,755. That composition consisted of a water-soluble cellulose ether, propylene glycol, and glycerine in certain stated proportions.

It is an object of this invention to provide water-soluble compositions of cellulose ethers, which compositions are capable of being thermally fabricated.

It has now been found that thermoplastic compositions may be prepared by mixing or blending certain water-soluble cellulose ethers with a plasticizer consisting of a mixture of an alkylene glycol and certain esters of citric acids as will be later described. Although these compositions are especially well adapted for thermal fabrication, they may also be used in conventional casting and dipping operations.

The cellulose ethers that are useful in the compositions of this invention are water-soluble alkyl, hydroxyalkyl, or alkyl hydroxyalkyl cellulose ethers in which the alkyl group may contain from 1 to 3 carbon atoms and in which the hydroxyalkyl group may contain from 2 to 3 carbon atoms. Of particular usefulness are methyl cellulose, hydroxypropyl cellulose, and methyl hydroxypropyl cellulose.

It is not critical in the compositions of this invention that the aforementioned ethers exhibit thermoplasticity in themselves. The chief requirement for use in this invention, besides the previously mentioned structural limitations, is water-solubility. It is well-known that methyl cellulose, and other cellulose ethers which are soluble in aqueous media, differ in their solubility properties depending on the extent to which they are etherified. The least etherified products are soluble only in dilute alkaline media, and often only at low temperatures. The somewhat more highly etherified materials are soluble in water. In a few cases the fully etherified compounds become insoluble in water and are soluble only in organic solvents. Also, certain alkyl hydroxyalkyl cellulose ethers, such as those described in our copending application Serial No. 394,484, filed November 25, 1953, are soluble in both aqueous and organic media.

Any of the commercially available viscosity grades of these cellulose ethers may be employed. The viscosity grade used will depend chiefly on the properties desired in the fabricated article and on other practical considerations such as the length of time required to blend the ethers with the plasticizers. The higher the intrinsic viscosity of the cellulose ether, the less fluid will be the composition and the longer will be the time required to mix in the plasticizer.

As previously mentioned, the useful plasticizers for the compositions of this invention are mixtures of alkylene glycols with certain esters of citric acid. Any alkylene glycol or polyalkylene glycol with a degree of polymerization no greater than 4 may be used in accordance with this invention. Typical examples of such glycols as ethylene glycol, diethylene glycol, triethylene glycol, tetraethylene glycol, propylene glycol, tripropylene glycol, n-butylene glycol 1,2, n-butylene glycol 2,3, glycerine, pentanediol 2,4 and hexanetriol 1,2,6. Substituted alkylene glycols may also be employed. Thus, 2-amino, 2-ethyl-propanediol 1,3, and 2-ethoxymethyl 2,4-dimethyl pentanediol 1,5, are also useful.

The esters which are suitable for use in this invention are those trialkyl esters of an acid selected from the group consisting of citric acid and acetylcitric acid in which each alkyl group contains no more than 6 carbon atoms. As typical examples of useful esters may be mentioned the triethyl, tributyl, and trihexyl esters of both citric and acetylcitric acid.

The proportions of the elements that make up the compositions are illustrated as being within the shaded area on the annexed drawing, in which apex A represents the alkylene glycol, apex B represents the ester of citric acid and apex C represents the cellulose ether. It can be seen that the amount of alkylene glycol which may be used may vary from 17 to 51 percent, the amount of citric acid ester from 8 to 32 percent, and the amount of cellulose ether from 34 to 72 percent. When larger amounts of cellulose ether are used, the resulting extruded strips are too stiff and when smaller amounts are used the plasticizer spews and the strips are too soft. When larger amounts of citric acid ester are used, the plasticizer spews and the strips are hazy and when smaller amounts are used the strips age poorly. The amount that is used in any particular composition will depend on the viscosity grade of the cellulose derivative, and on the intended use of the composition. It should be obvious that when the very high viscosity grades of cellulose ethers (4000 centipoises or higher) are used, high concentrations of the cellulose ether are impractical because the resulting solutions are so viscous that they cannot be easily worked. Also, the fluidity of the plasticized composition that is necessary varies with the type of fabricating operation. For casting and dipping operations, the solutions must have greater fluidity than with most thermal operations, such as injection molding or extrusion. When reference is made herein to the viscosity grade of the cellulose ether, this is the viscosity in centipoises of a 2 percent solution of that ether by weight in water at 20° C.

The compositions of this invention are an improvement over the previously known compositions containing propylene glycol and glycerine because of the increased compatibility of the citrates as compared to glycerine. This increased compatibility gives fabricated articles having greater clarity, flexibility, and dimensional stability, and lower plasticizer loss on aging. Also higher ratios of citrates to propylene glycol than of glycerine to propylene glycol can be employed where soft, flexible articles are desired.

The compositions of the invention will be further defined by the following illustrative examples.

Example 1

A composition was prepared consisting of 40 parts by weight of a water-soluble methyl hydroxypropyl cellulose (100 cps. viscosity grade), 45 parts by weight of propylene glycol, and 15 parts by weight of triethyl acetylcitrate. The mixture was heated to 140° C. with agitation to effect solution. The resulting composition was uniformly clear with no evidence of gels.

When the above composition was subjected to extrusion conditions, a clear flexible strip was obtained.

In a like manner similar compositions were prepared using diethylene glycol, n-butylene glycol 1,2, and pentanediol 2,4 in place of the propylene glycol. These compositions could be extruded to produce clear and flexible strips or sheets.

Example 2

Similar compositions to those of Example 1 were produced using trihexyl citrate in place of the tributyl acetylcitrate. The compositions could be extruded into a flexible strip from which pharmaceutical capsules could be prepared by vacuum drawing the strip in a cavity mold. The capsules compared favorably with the common gelatin capsules.

In a similar manner compositions were prepared using water-soluble methyl cellulose (50 cps. viscosity grade) and hydroxyethyl cellulose in place of the methyl hydroxypropyl cellulose. The compositions were compression molded into clear sheets from which capsules could be prepared by vacuum drawing the strip in a cavity mold.

We claim:

1. A thermoplastic composition consisting of (a) from 34 to 72 percent of a water-soluble cellulose ether selected from the group of alkyl cellulose, hydroxyalkyl cellulose, and alkyl hydroxyalkyl cellulose in which the alkyl group contains from 1 to 3 carbon atoms and the hydroxyalkyl group contains from 2 to 3 carbon atoms, (b) from 17 to 51 percent of an alkylene glycol, and (c) from 8 to 32 percent of a trialkyl ester of an acid selected from the group consisting of citric acid and acetylcitric acid in which the alkyl group contains from 1 to 6 carbon atoms; the proportions of each constituent being chosen so as to be represented by any point within the shaded area on the annexed drawing.

2. The composition as claimed in claim 1 wherein the cellulose ether is a water-soluble methyl cellulose.

3. The composition as claimed in claim 1 wherein the cellulose ether is a water-soluble methyl hydroxypropyl cellulose.

4. The composition as claimed in claim 1 wherein the cellulose ether is a water-soluble hydroxyethyl cellulose.

5. The composition as claimed in claim 1 wherein the ester is triethyl acetylcitrate.

6. The composition as claimed in claim 1 wherein the ester is tributyl citrate.

References Cited in the file of this patent

UNITED STATES PATENTS

| | | |
|---|---|---|
| 1,735,158 | Carroll | Nov. 12, 1929 |
| 2,322,013 | Gilbert | June 15, 1943 |
| 2,479,037 | Chambers | Aug. 16, 1949 |
| 2,602,755 | Silvernail | July 8, 1952 |